May 21, 1957  J. W. GRAHAM ET AL  2,792,894
METHOD OF INCREASING OIL PRODUCTION
Filed Sept. 3, 1953  11 Sheets-Sheet 10

INVENTORS.
JOHN W. GRAHAM,
WILLIAM M. McCARDELL,
JOSEPH G. RICHARDSON,
JOSEPH S. OSOBA,
BY
ATTORNEY.

FIG. 11.

Spraberry Imbibition
Core — Lgth. = 5.64 cm., rad. = 1.26 cm., K = 0.29 md
Imbibition Sequence
(a) 14% Salt-water Solution
(b) 14% Salt-water + 0.1% Hyamine 2389

Hyamine added

% OIL IN PLACE PRODUCED
TIME; HOURS

INVENTORS.
JOHN W. GRAHAM,
WILLIAM M. McCARDELL,
JOSEPH G. RICHARDSON,
JOSEPH S. OSOBA.
BY
ATTORNEY.

2,792,894
Patented May 21, 1957

2,792,894
METHOD OF INCREASING OIL PRODUCTION

John W. Graham and William M. McCardell, Bellaire, and Joseph S. Osoba and Joseph G. Richardson, Houston, Tex., assignors, by mesne assignments, to Esso Research and Engineering Company, Elizabeth, N. J., a corporation of Delaware Application September 3, 1953, Serial No. 378,299

15 Claims. (Cl. 166—42)

The present invention is directed to a process for recovering petroleum from a subsurface rock formation. More particularly, the invention is directed to recovery of petroleum from earth formations characterized by marked capillary differences. In its more specific aspects, the invention is directed to a petroleum recovery process in which a petroleum is recovered from rock formation characterized by marked capillary differences by contacting the rock formations with a suitable fluid.

The present invention may be briefly described as involving a method for recovering petroleum from a subsurface petroleum source rock formation which comprises porous rock solids sections adjacent channels of higher permeability than the porous rock solids sections. The particular feature of the invention comprises first imbibing water into the porous rock sections until substantial water saturation is obtained in the porous rock sections immediately adjoining said channels of higher permeability. Thus only a portion of the formation is substantially saturated with water. The portion saturated with water extends from the channels of higher permeability into the porous rock sections a sufficient distance to wet the rock solids by the advancing front of the imbibing fluid inside the solid. Thereafter, additional water is imbibed containing an effective amount of a surface active agent into the solids sections containing imbibed water to cause petroleum in the source rock to flow from the source rock into the channels. Petroleum is then recovered from the channels.

The imbibing of water into porous rock solids has been described in the literature. Particular attention is directed to the paper by E. R. Brownscombe and A. B. Dyes presented at the thirty-second annual A. P. I. meeting in Chicago, Illinois, in November 1952 and published in the Oil & Gas Journal, v. 51, No. 28, p. 264 (11/17/52). In the paper by Brownscombe and Dyes, the imbibition of water into a formation, such as the Spraberry trend in West Texas, is one in which the water is allowed to soak in the rock matrix. Oil flows from the rock matrix after being displaced by the water into the fractures or channels adjacent the matrix, the oil then being produced from the fractures or the channels. In the imbibing of water into said porous rock sections, oil oozes out of the same surface into which the water is entering, allowing the recovery of the oil. In the present invention, the water imbibition operation is improved by a sequence of operations in which the rock sections are allowed to imbibe water to substantial saturation of the rock sections adjacent the channels such that the imbibing rock is wet by the water being imbibed and thereafter the water has added to it a surface active agent which causes the imbibition of additional quantities of water and, therefore, recovery of additional quantities of oil over and beyond that obtainable by imbibing water in the porous rock sections. In addition, and perhaps more important, the rate at which the petroleum is recovered from the porous rock sections after addition of the surface active agent to the imbibing water is much greater than the rate obtainable by imbibing water alone into the porous rock sections.

The present invention has particular applicability to producing oils from subsurface earth formations containing petroleum which will imbibe water and which are characterized by capillary discontinuities. Such earth formations may have relatively low or relatively high permeabilities but contain fractures, zones, or channels characterized by capillary discontinuities of a permeability different from the rock matrix. For example, the highly fractured Spraberry trend in West Texas is such a formation containing capillary discontinuities. These subsurface formations to which the present invention is applicable are characterized by source rock containing petroleum in which the source rock consists of sections characterized by marked capillary differences between porous rock sections and channels adjacent the rock sections that are more permeable than the porous rock sections. Because of the high capillary forces present in such rocks, ordinarily the dissolved gas therein is preferentially produced from said rocks while the oil is selectively retained therein. Therefore, only a very small amount of oil is produced from such rocks when the pressure in the crevices or fractures is reduced as is done in normal production practices. Also, the practice of sweeping oil out of formations with fluids as is done in conventional secondary recovery operations is ineffective in formations where the source rock contains higher permeability channels or capillary discontinuities. In such operations the sweeping fluids flow through the more permeable channels and bypass the less permeable sections of the matrix or source rock. In the present invention the less permeable sections of source rock are contacted with water to allow the porous rock sections to imbibe the water or soak the water up like a blotter at the imbibition face of the rock section. As the water moves into the porous rock the oil contacted therein is displaced into the fractures or channels or zones of higher permeability adjacent the rock matrix allowing the oil to be produced from the channels and recovered.

In practicing the present invention a surface active agent is included in the water imbibed in the porous rock sections after the porous rock sections have imbibed water to substantially the saturation point of the porous solids rock sections adjacent the channels or fractures to allow wetting of the solids. This allows additional quantities of oil to be produced from the channels by displacement of the oil by the water. Thus, in the present invention, the rock sections first soak up water in those portions adjacent the channels and then soak up additional water containing a surface active agent in an effective amount.

In practicing the present invention a surface active agent in an amount less than the amount included in the water used after the rock has imbibed water may be included in the water initially imbibed to cause the advancing front of liquid inside the solid to wet the solid. Thereafter when the solid has been wet with imbibed water to substantial saturation of that portion of the formation adjacent the channels such that the solids are wet by the liquid being imbibed, the surface active agent is employed in an effective amount in the water subsequently imbibed to produce the petroleum in additional quantities and at a greater rate.

The surface active agent employed in the present invention may be any of the numerous surface active agents available on the market. The surface active agent may be one of the non-ionic type, anionic, or cationic type. Many surface active agents fill these requirements among which may be mentioned alkyl aryl polyether alcohols which are non-ionic; the alkali metal salts of alkyl aryl polyether sulfates, the ammonium salt of perfluoro lauric acid, di-octyl alkali metal sulfosuccinate which are anionic; alkyl dodecyl benzyl trimethyl ammonium chloride, di-isobutyl phenoxy ethoxy ethyl dimethyl benzyl ammonium chloride and tertiary alkyl tetraethoxy ethanolamine which are cationic, as well as many others such as anionic alkyl aryl sulfonates, anionic alkyl sulfates and sulfonates, anionic sulfonated amides, anionic sulfonated mono-glycerides, alkali metal salts of perfluoro alkyl acids which are also anionic, and quaternary ammonium salts which are cationic. For other surface active agents suitable for use in the present invention, reference is made to "Encyclopedia of Surface-Active Agents" by J. P. Sisley, translated from the French by P. J. Wood, Chemical Publishing Co., New York, 1952.

In the practice of any imbibition process the advancing front of the displacing phase inside the solid must wet the solid. Substantial advantage over the ordinary imbibition process can be obtained by the practice of this invention in which a gradient in interfacial tension and/or increased wetting ability is created by addition of suitable surface active agents in effective amounts to the imbibing water after substantial water saturation has been attained in those portions of the porous rock sections immediately adjoining the imbibition faces.

The water used initially may contain a surface active agent different from the surface active agent employed in the subsequent imbibition of water after the initial imbibition. Also, the water initially employed for imbibing in the rock sections may contain a surface active agent or agents in a quantity less than that used in subsequent imbibition.

The amount of the surface active agent used after the rock sections have imbibed water to substantial saturation of the rock section adjacent the channels to wet the solids by the advancing front of the water may range from about 0.001% by weight to about 1.0% by weight of the water imbibed after the initial imbibing operation. The amount of the surface active agent which may be used in the initial imbibition is substantially less than the amount used in the second step of the process. For example, the amount used initially, if any, may range from about 0.0001% to 0.005% by weight of the water imbibed during initial imbibition while the amount used thereafter is a greater amount in the range from about 0.001 to about 1.0% by weight of the imbibed water.

Water will be imbibed under the above circumstances regardless of the pressure of the water on the system. In actual practice the water, of course, must be introduced at sufficient pressure to fill the channels of higher permeability and thus to reach the imbibition faces of the formation. The pressure that will accomplish this is suitable for our purpose. Thus water may be imbibed by the rock sections under hydrostatic pressure sufficient to get the imbibing water to the rock into which it is to be imbibed. It may be desirable, however, to employ a pressure in the range from about 100 pounds or less per square inch up to as high as the overburden pressure of the formation. The overburden pressure may range from 5000 to 10,000 pounds per square inch and in some instances less than or greater than this range of pressure. Ordinarily, a pressure in the range from about 1000 to 3000 pounds per square inch on the water imbibed will give quite satisfactory results and may sometimes be preferred.

The time for the attainment of a suitable substantial water saturation will vary widely, depending upon the type of formation and the frequency and distribution of the channels of higher permeability. When those portions of the rock sections immediately adjoining the channels of higher permeability have attained water saturations in the range of 30 to 95% of the pore space available in these sections for distances of 1% to 20% of the maximum distances to be imbibed, the formation may be said to have reached a suitable substantial water saturation. The water containing the surface active agent or agents is then forced into the channels of higher permeability and is maintained there for the rest of the productive life of the formation. In imbibing water into cores having a length to diameter ratio of about 2:1, initial saturation by water imbibition requires approximately one hour.

The degree of substantial water saturation in the rock matrix adjacent the capillary discontinuities or channels or fractures may be determined by obtaining cores from the formation into which water is to be imbibed in accordance with our invention. Once a representative core has been obtained, it may then be contacted or exposed to water under imbibition conditions to determine the rate at which water is being imbibed at the imbibition face. This will be analogous to imbibition in the formation adjacent a channel or a zone of capillary discontinuity. By observing the imbibition rate into samples, it is possible then to determine the most advantageous point at which the surface active agent is to be added to the water to change its characteristics. It is necessary to know the frequency and distribution of fractures or discontinuities of the particular formation and the other geological information such as the volume of rock contained between boundaries of fractures, the permeability of the particular rock formation and other textural characteristics of the formation. Thus, for example, it may be determined by experiments with cores from a particular formation such as Spraberry having a permeability of 0.6 millidarcy and in which the fractures bound a volume of rock of approximately 500 cubic feet, but which may range from 100 to 2000 cubic feet, that the water most advantageously may be imbibed in the first step of our operation for a period of time extending over several months, for example from 1 to 12 months. After this period of imbibition it may be found that the rock matrix adjacent the channels or fractures or capillary discontinuities has been substantially saturated by the imbibing water. At that time the imbibing characteristics of the water are changed by adding a sufficient amount of the surface active agent to the water. With respect to other formations having properties similar to those of the Berea outcrop cores on which numerous runs have been made, as will be shown hereinafter in more detail, a permeability of approximately 200 millidarcys is typical and such formations may imbibe water for a period of several weeks, for example approximately 1 to 20 weeks, to obtain substantial saturation of the rock formation adjacent the channels or fractures or capillary discontinuities. Such formations include sandstones and the like having fractures, channels or capillary discontinuities and may have permeabilities ranging from 0.1 to 1000 millidarcys. The rock matrixes of sandstones having permeabilities in this latter range bounded by such channels or discontinuities may have volumes ranging from 10 to 2000 cubic feet.

It may be seen from the foregoing brief description that the time at which the surface active agent is added to the imbibing water is dependent on several factors including the permeability and other textural characteristics of the particular formation, the frequency and distribution of fractures or capillary discontinuities, and the volume of rock enclosed or bound by the channels or fractures or discontinuities. These factors must be determined for each particular formation into which water is to be imbibed.

In a general way it may be stated that the time at which the surface active agent is injected into the water imbibing into sandstones or certain limestones of the type illustrated may range from a week to several years, for example approximately 1 week to 3 years. Thus, after the water has been imbibed for a period of time encompassed by this range, the characteristics of the water are changed by adding the surface active agent to it in a sufficient amount. While we have given particular attention and consideration to the means for determining when the surface active agent is to be added to the water, we do not intend to limit ourselves to any particular time or period since this time or period must be determined by the geological formation and the characteristics thereof into which water is being imbibed.

It is possible to determine the amount or volume of oil produced as a function of time by suspending a core of the particular formation in the imbibition water from one side of a crossbeam balance. Thus a core is imbedded in Lucite so that only one imbibition face is exposed through which water is imbibed and from which oil is obtained. The volume of oil produced from the imbibition face by the imbibition of water is observed as a function of time by the apparent change in weight.

The saturation of the rock matrix adjacent the imbibition face may be determined by an electrical resistivity method, such as that described by Dunlap, Bilhartz, Schuler and Bailey at the Fall meeting of the A. I. M. E., San Antonio, October 5 to 7, 1949.

The properties of the particular formations such as permeabilities, degree of fracturing, capillary discontinuity, or channeling, porosity, connate water, and the like are determined by the usual geological observations of core samples and other information obtained from test bores or in drilling a well through the particular formation.

The present invention will be further illustrated by reference to the drawing in which Fig. 1 illustrates a preferred mode of practicing the invention;

Figure 8:
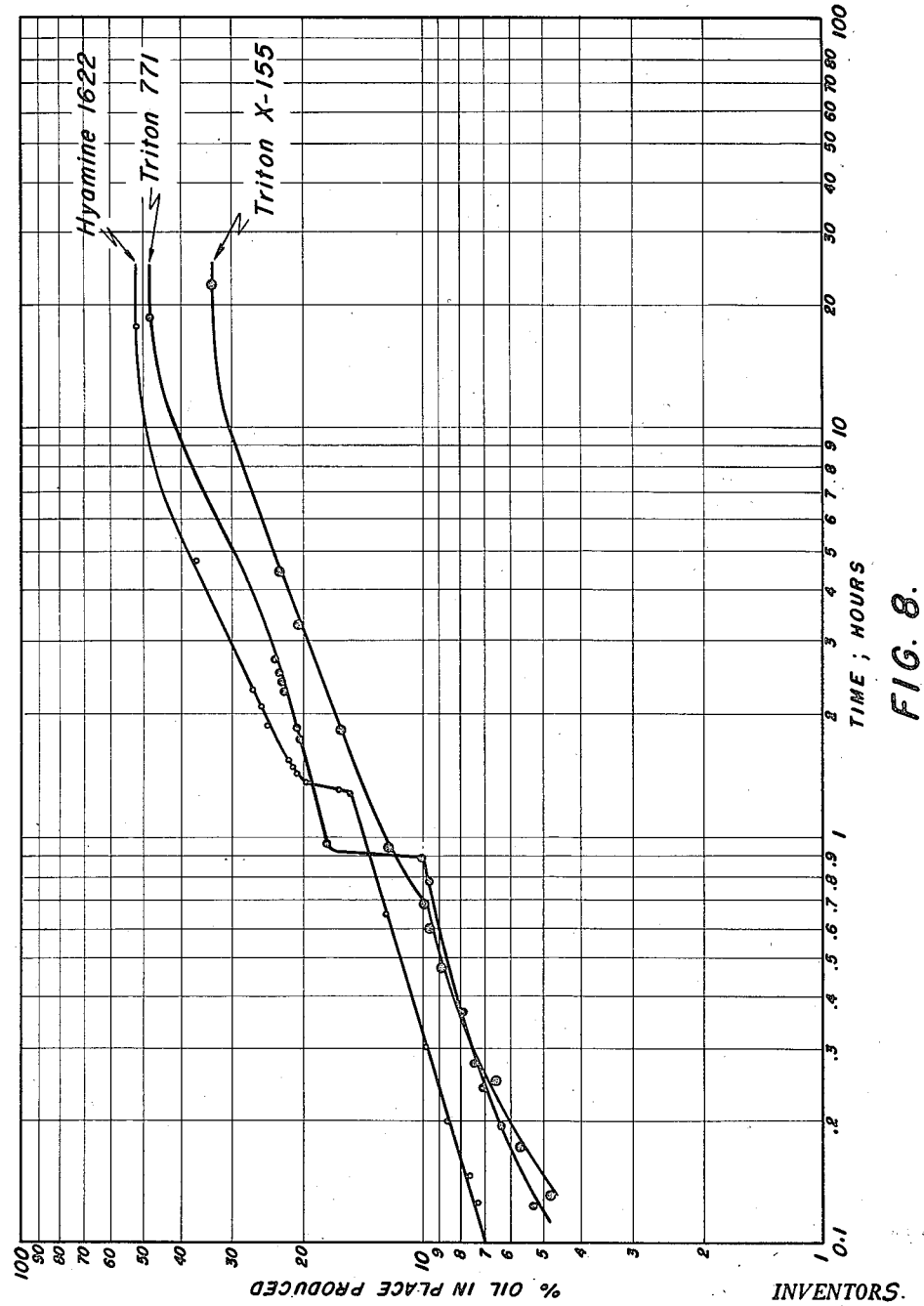
Figure 9:
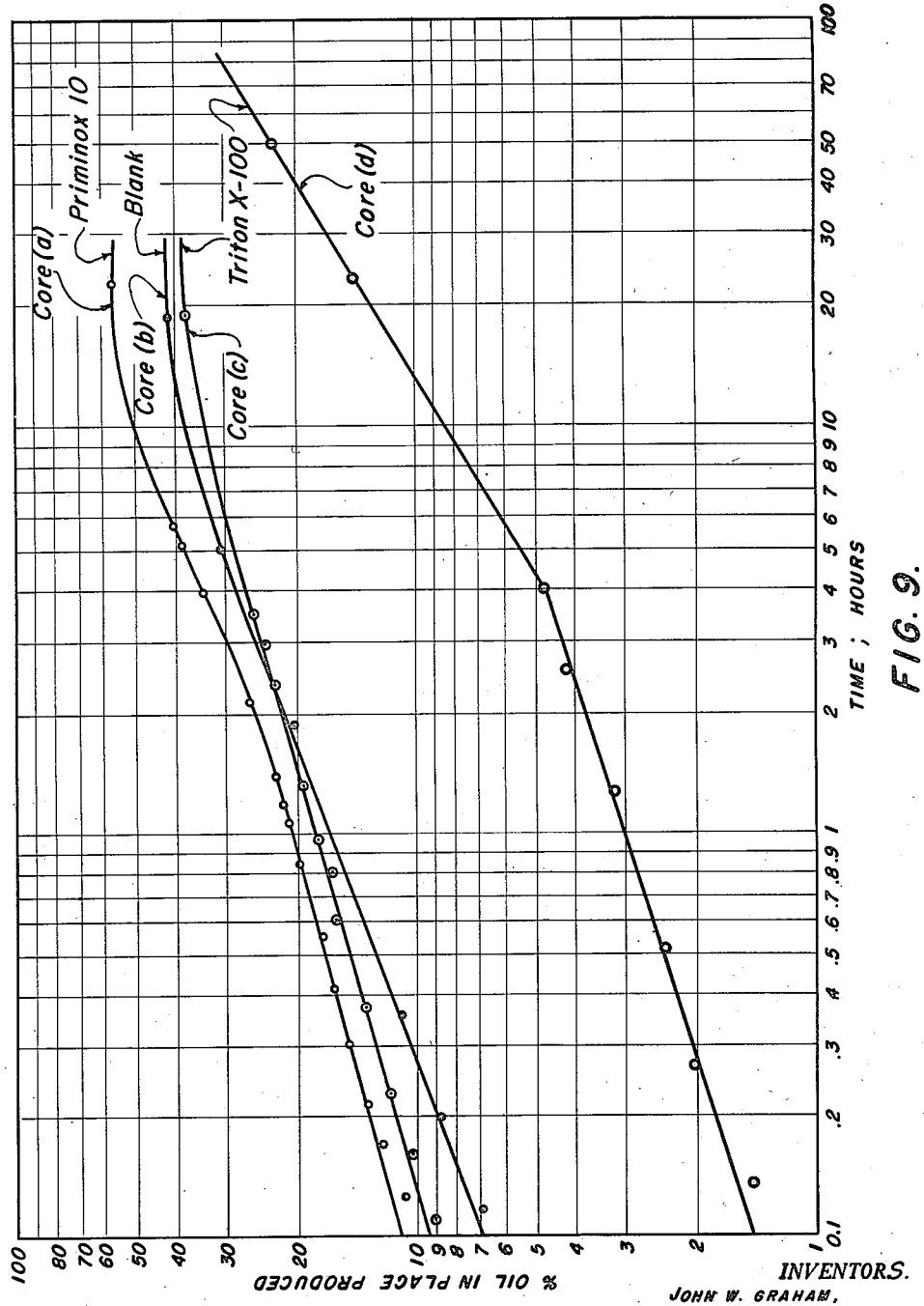
Figure 10:
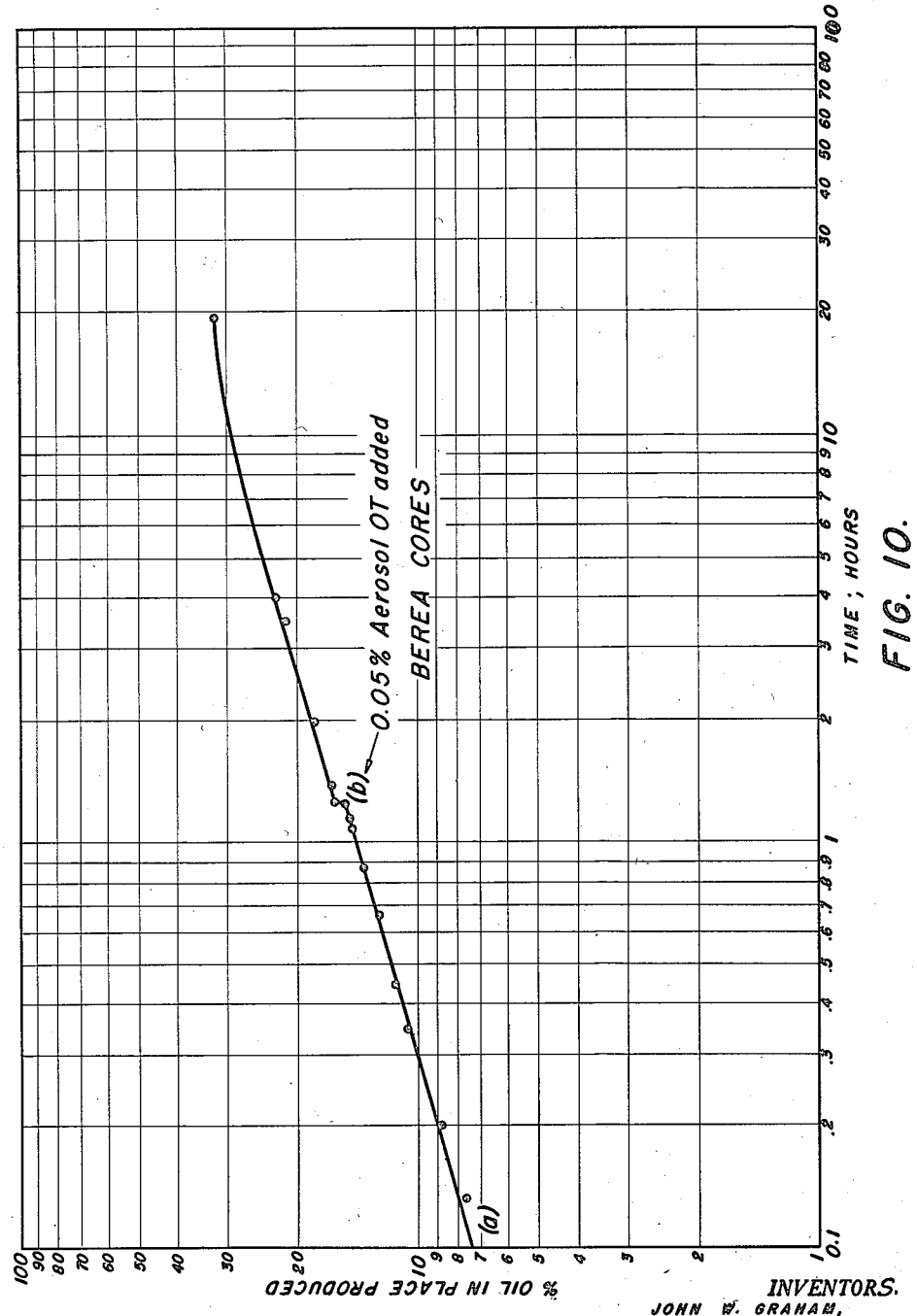

Fig. 8 compares different types of surface active agents in the imbibition operation;

Fig. 9 represents a comparison between the precent invention and the prior art practices;

Fig. 10 illustrates the operation in the present invention of a surface active agent employing a sandstone from a Berea outcrop; and Fig. 11 illustrates a further operation in accordance with this invention.

Figure 1:
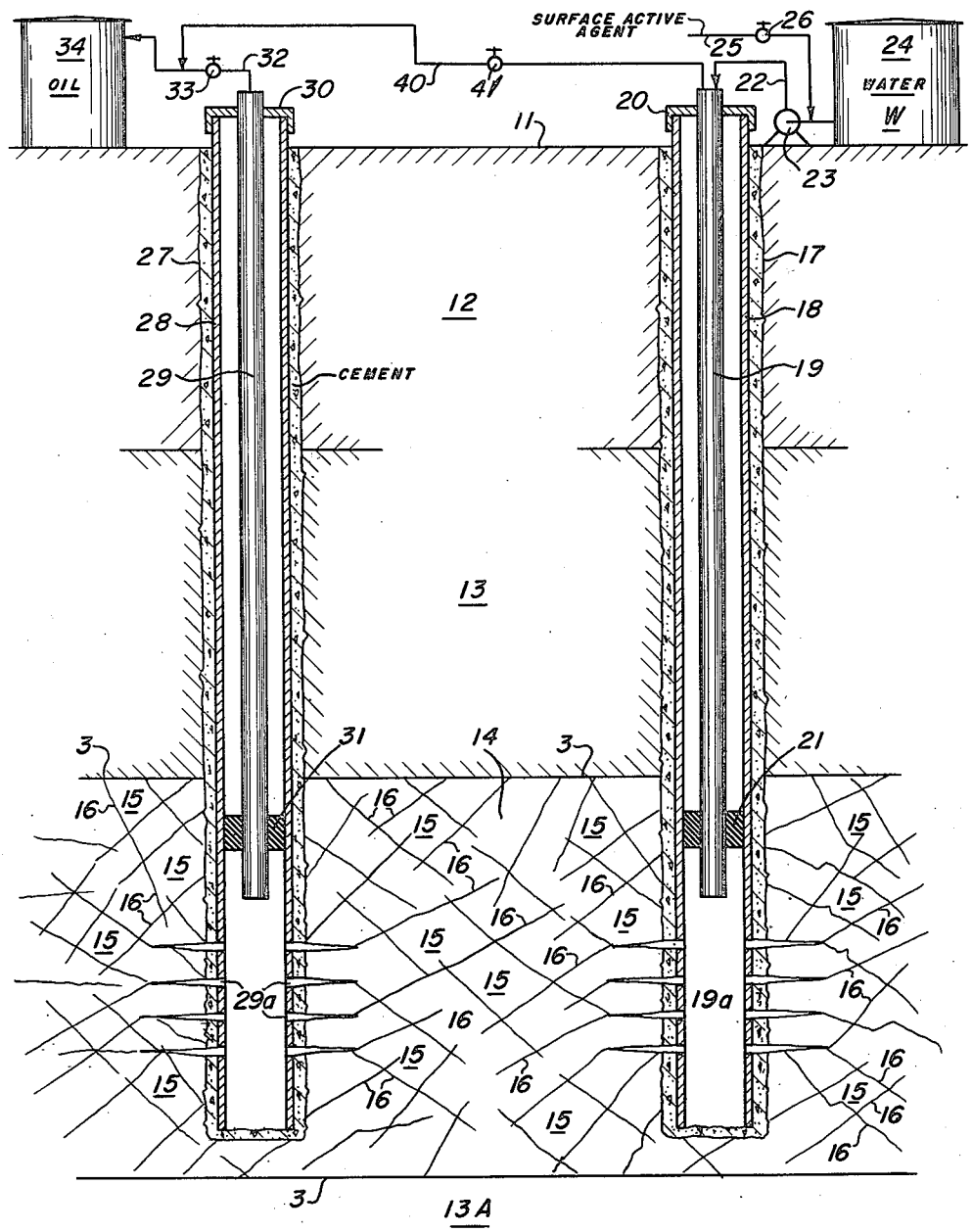

The invention will be further illustrated by reference to Fig. 1 which shows a preferred mode. Referring to Fig. 1, numeral 11 designates the earth's surface overlying formations 12, 13, and a producing formation 14 of the type described before which is characterized by rock sections or matrixes 15 adjacent fractures or channels 16. The formation 14 is sealed by impermeable seals 3 from the formations 13 and 13a. Extending to the earth's surface 11 and penetrating the several formations 12, 13, and 14 is a first well 17 which is sealed by suitable means, such as cement, and is provided with a casing 18 which has been perforated to form perforations 19a communicating with the formation 14. Arranged in the casing 18 is a tubing string 19 extending to the earth's surface and through the wellhead 20. The tubing 19 extending into the portion of the well 17 in the formation 14 is suitably isolated from the upper formations by a packer 21.

The tubing 19 is connected by means of line 22 containing pump 23 to a tank 24 which contains a body of water "W." Leading into line 22 is a branch line 25 controlled by valve 26 by way of which a surface active agent may be introduced into the water flowing from tank 24 through line 22 into tubing 19.

Extending from the earth's surface 11 through the formations 12 and 13 and into formation 14 is a second well 27 in which is arranged a casing 28, also suitably sealed or cemented in the well 27. A tubing 29 extends from a wellhead 30 down into the well 27 and into the producing formation 14. The lower end of the tubing 29 is isolated by a packer 31 which serves to isolate the formation 14 from the formation 13. The casing 28 is suitably perforated with perforations 29a allowing communication between the interior of the casing and the formation 14.

Connected to the tubing 29 at the wellhead 30 is line 32 controlled by valve 33 which connects into a tank 34 for storage of oil produced from the well 27.

The present invention operates in the following manner:

It may be assumed for the purposes of this description that the wells 17 and 27 have penetrated the formation, like 14, which may be of a highly fractured nature and/or contains channels of higher permeability as has been described and it is desired to produce oil from the matrix through the channels 16 into the well 27. The wells are arranged in a pattern, if desired, to allow maximum recovery of the oil. Water "W" would be pumped from the tank 24 by pump 23 by way of line 22 into tubing 19 and allowed to imbibe into the rock sections 15 until substantial saturation has been achieved of that portion of the rock sections adjacent the channels such that water imbided has wet the solids. Thereafter valve 26 in line 25 would be opened and water would continue to be pumped into the formation 14 but would contain an effective amount of a surface active agent. As the water is imbibed by the rock sections 15, oil would flow into the channels 16 and thence into the well 27 and to the earth's surface 11 through the tubing 29, the valve 33 in line 32 being open, allowing oil to be recovered and stored in tank 34.

It is possible to operate the present invention employing only one well for introduction of imbibing water and for recovery of oil. Thus, it is contemplated that water may be introduced into formation 14 through well 17 and oil also recovered from well 17. In this event, the oil would flow through tubing 19 into a branch line 40 control led by valve 41 which connects into line 32 downstream from valve 33 which allows the oil produced from well 17 to flow into tank 34. Of course, it is to be understood that under these conditions well 27 may be shut in and also that flow of water from tank 24 may be suspended during these operations.

It is possible to imbibe water by and produce oil from the same well since in the imbibition operation the oil is recovered at the imbibition face where the water is imbibed.

Figure 2:
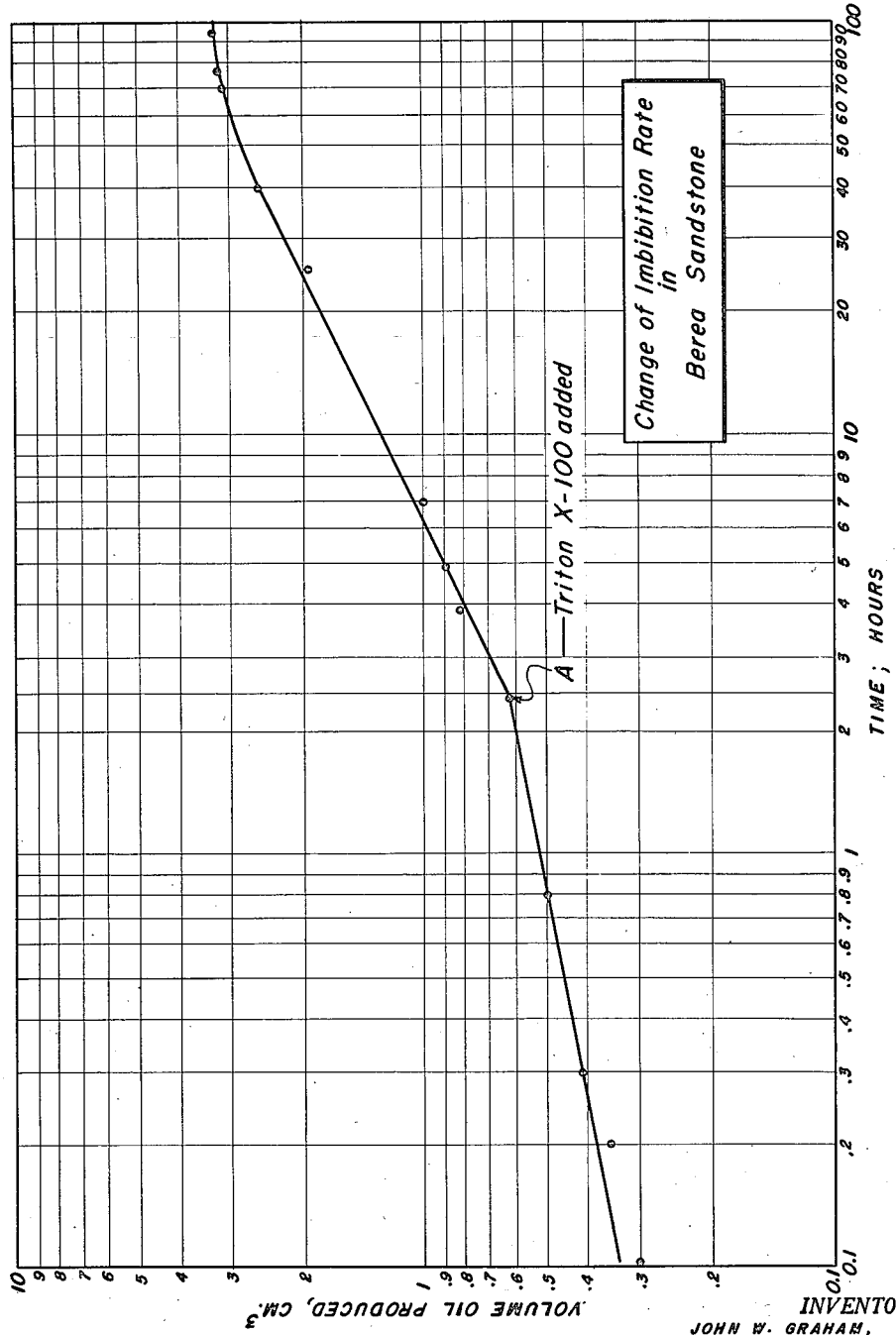
Fig. 2 illustrates the change of imbibition rate in Berea sandstone illustrating the practice of the present invention.

In order to illustrate the invention further a cylindrical Berea sandstone core was surrounded and sealed by Lucite except for one end (the imbibition face). This sandstone core was prepared to contain kerosene and connate water. The core was allowed to imbibe water and produce oil for a period of 2.4 hours after which time the imbibition water was altered to contain 0.02% by weight of a surface active agent commonly called Triton X-100, the identity of which will be described hereinafter. The results of this operation are shown in Fig. 2 where the volume of oil produced is plotted against the time. At point "A" a distinct break in the curve occurs indicating an increased oil production rate due to the addition of the surface active agent, Triton X-100, at this point. Thus, it will be seen that the surface active agent was added after about 2½ hours imbibition and after 100 hours the curve is tending to flatten off again showing that the amount of oil produced has about reached its maximum at that point of time.

A number of tests were then made on 14 cores from the

Spraberry trend in West Texas and on a Berea core. These cores were approximately 1 inch in diameter and 2 inches long. The cores were extracted and dried and then allowed to imbibe sufficient water containing 14% salt to bring the water saturation in the cores up to a value approximating the connate water of the formation. Kerosene was then introduced into the cores until the cores were substantially saturated with kerosene. Following the introduction of the kerosene, the cores were allowed to imbibe a 14% salt water solution which displaced some of the kerosene. After an imbibition period of 10 days, the imbibition of water and the production of oil had ceased. The average value of the volume of kerosene collected corresponded to 30% of that originally placed in the cores. Following the ten-day exposure to the salt water solution, the cores were then exposed to a solution which contained 1.0% of Triton X–100. After three weeks exposure to this solution the cores had imbibed sufficient water to cause the production of an additional 15% of the kerosene, giving a total recovery of 45% of the kerosene originally in the cores.

Figure 3:
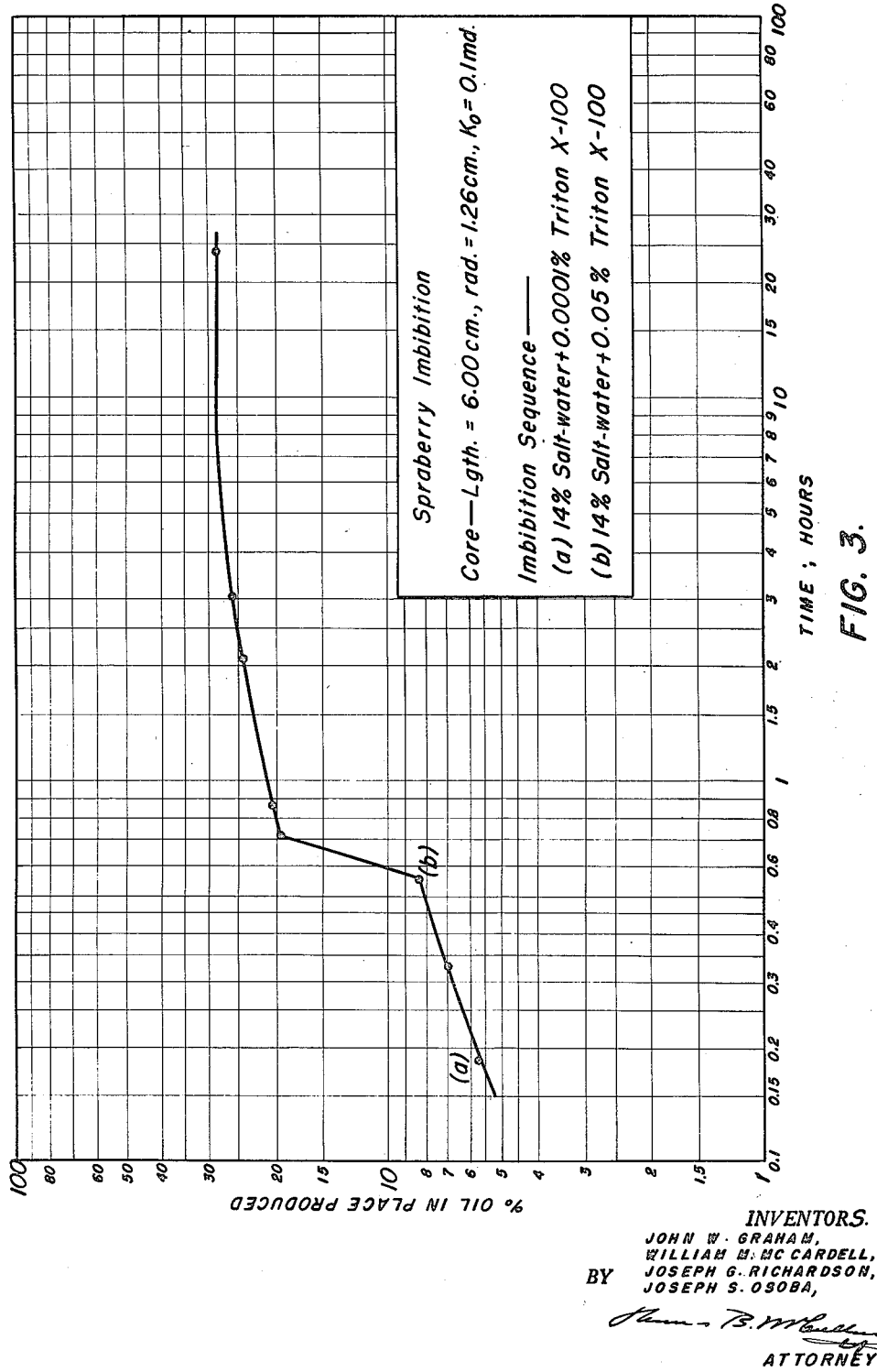
Fig. 3 shows the results of imbibing salt water in accordance with the present invention in a core from the Spraberry trend.
Figure 4:
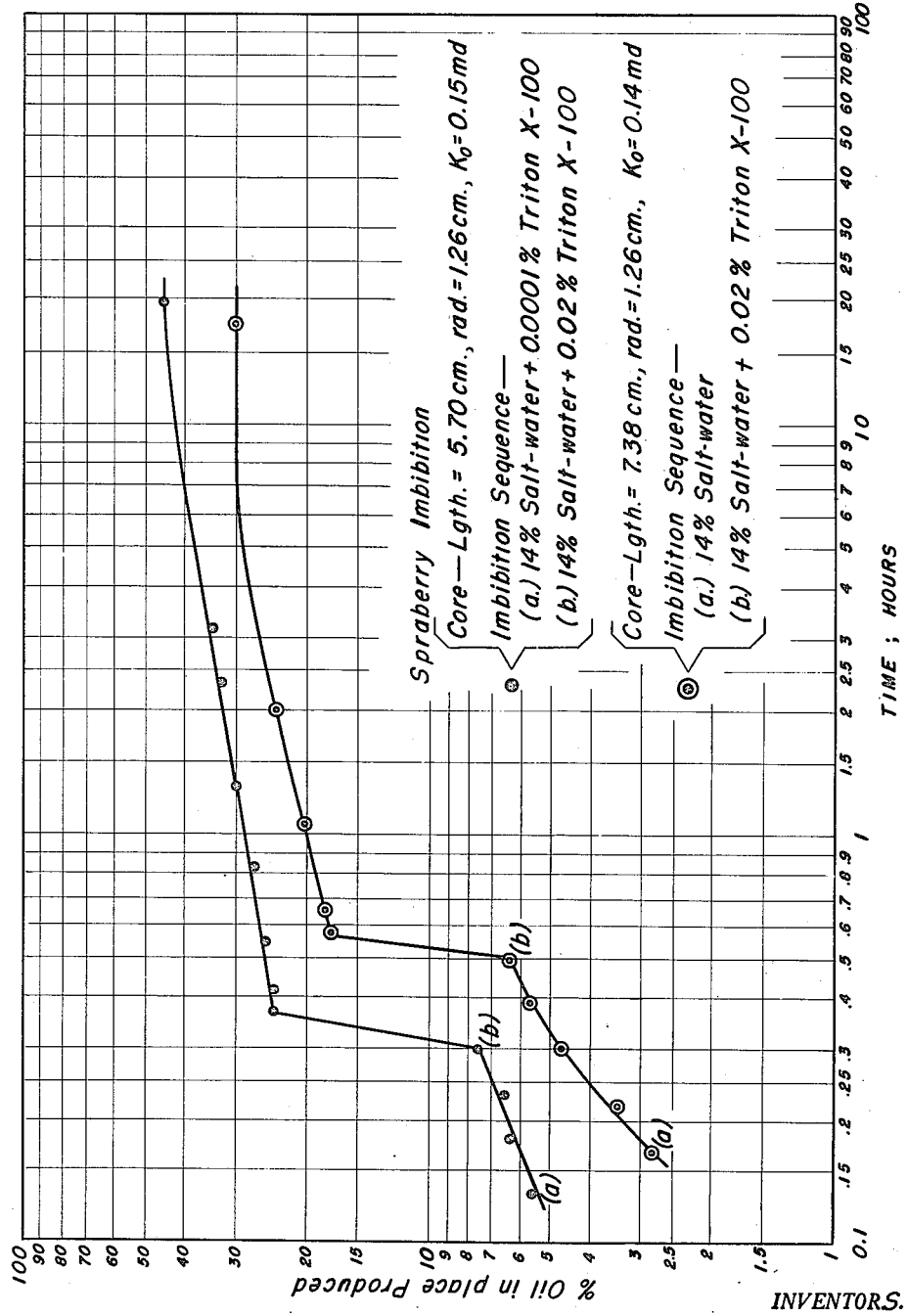
Fig. 4 illustrates the imbibition operation in cores from the Spraberry trend showing a comparison between imbibition with salt water initially with a surface active agent and imbibition initially with salt water without a surface active agent followed by imbibition in both cases with salt water containing a surface active agent.

In a second series of tests, 4 cores were cut from sections of a larger Spraberry core which had been protected from exposure to air by wrapping with aluminum foil and embedding in paraffin as soon as it was removed from the core barrel in the field. Thus the core was maintained substantially in its original condition. This large core was cut into smaller samples under kerosene. In the first experiment the four small cores were flooded with gas-free kerosene to replace the reservoir oil and then their permeabilities were determined by flowing gas-free kerosene through them. Imbibition tests were made to determine the effect of the Triton X–100 on the production of kerosene by imbibition of the 14% salt water containing the Triton X–100 into the cores. The results of these tests are presented in Figs. 3, 4, and 5 which show the amount of kerosene produced with time under various conditions of imbibition. As indicated in Fig. 3, the addition of 0.05% Triton X–100 markedly increased the production of oil. The results presented in Figs. 3 and 4 show that changing the concentration of the Triton X–100 from 0.0001% to 0.05% and 0.02% by weight markedly increased the oil production.

Figure 5:
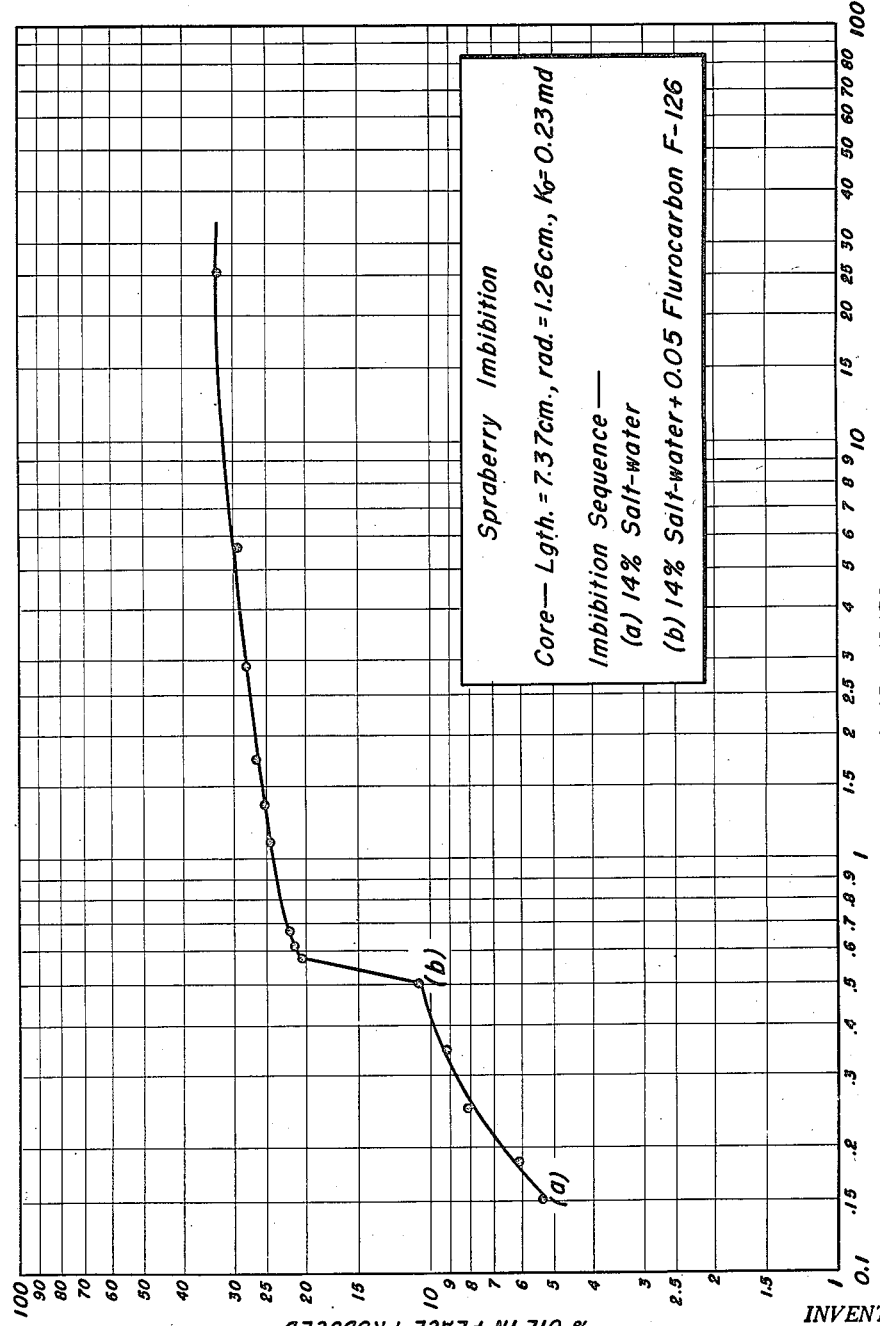
Fig. 5 illustrates the imbibition operation using a different kind of surface active agent.

The results of a second test presented in Fig. 5 show a similar sharp increase in oil production when 0.05% of fluorocarbon F–126 was added to the 14% salt water being imbibed by the core. The fluorocarbon used in these tests was the ammonium salt of perfluoro lauric acid. The percentage of oil recovered as shown in Figs. 3, 4, and 5 was based on a porosity of 12.5% and a connate water content of 30%.

Figure 6:
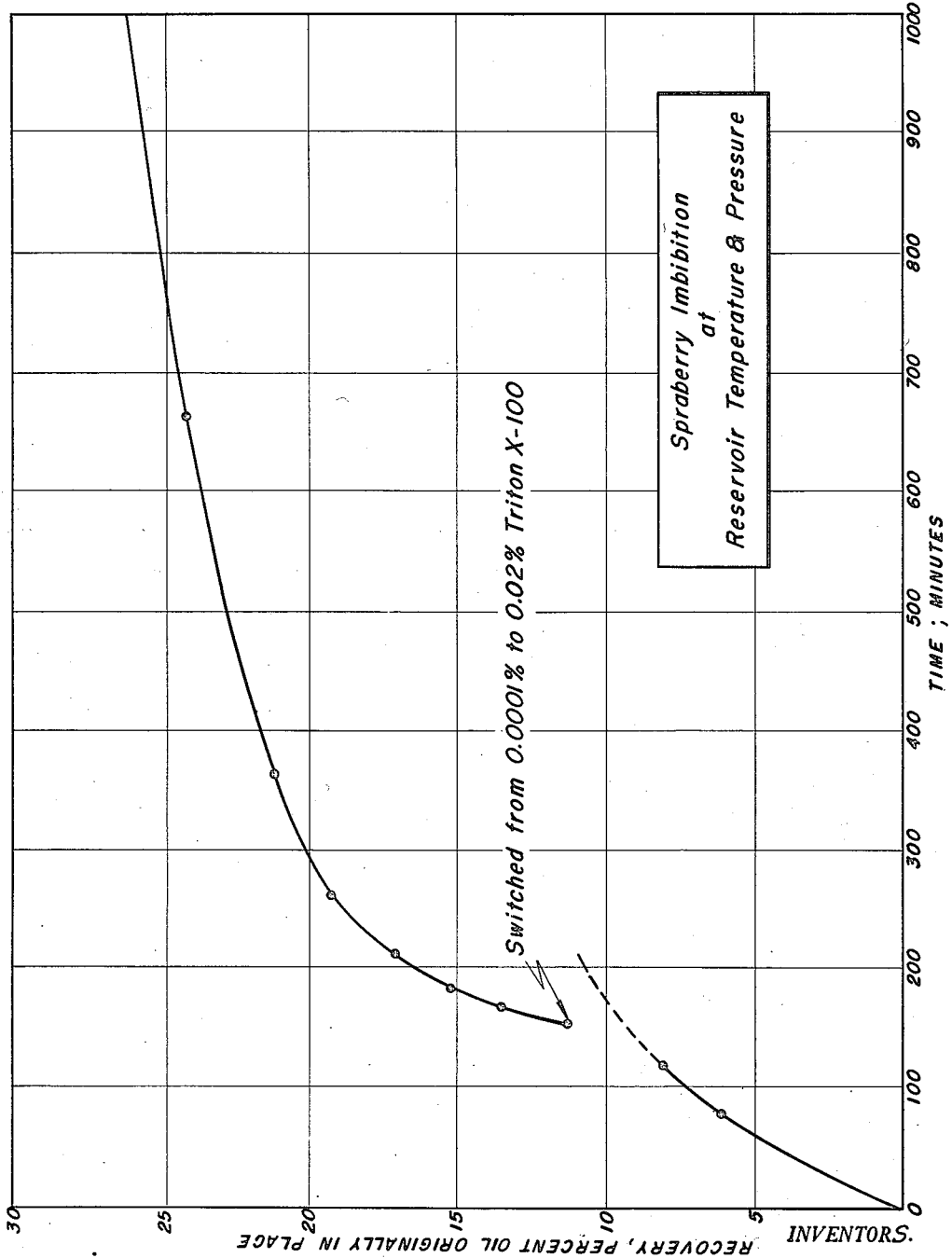
Figs. 6 and 7 show imbibition of Spraberry trend at reservoir temperature and pressure where the amount of surface active agent is increased in accordance with this invention.
Figure 7:
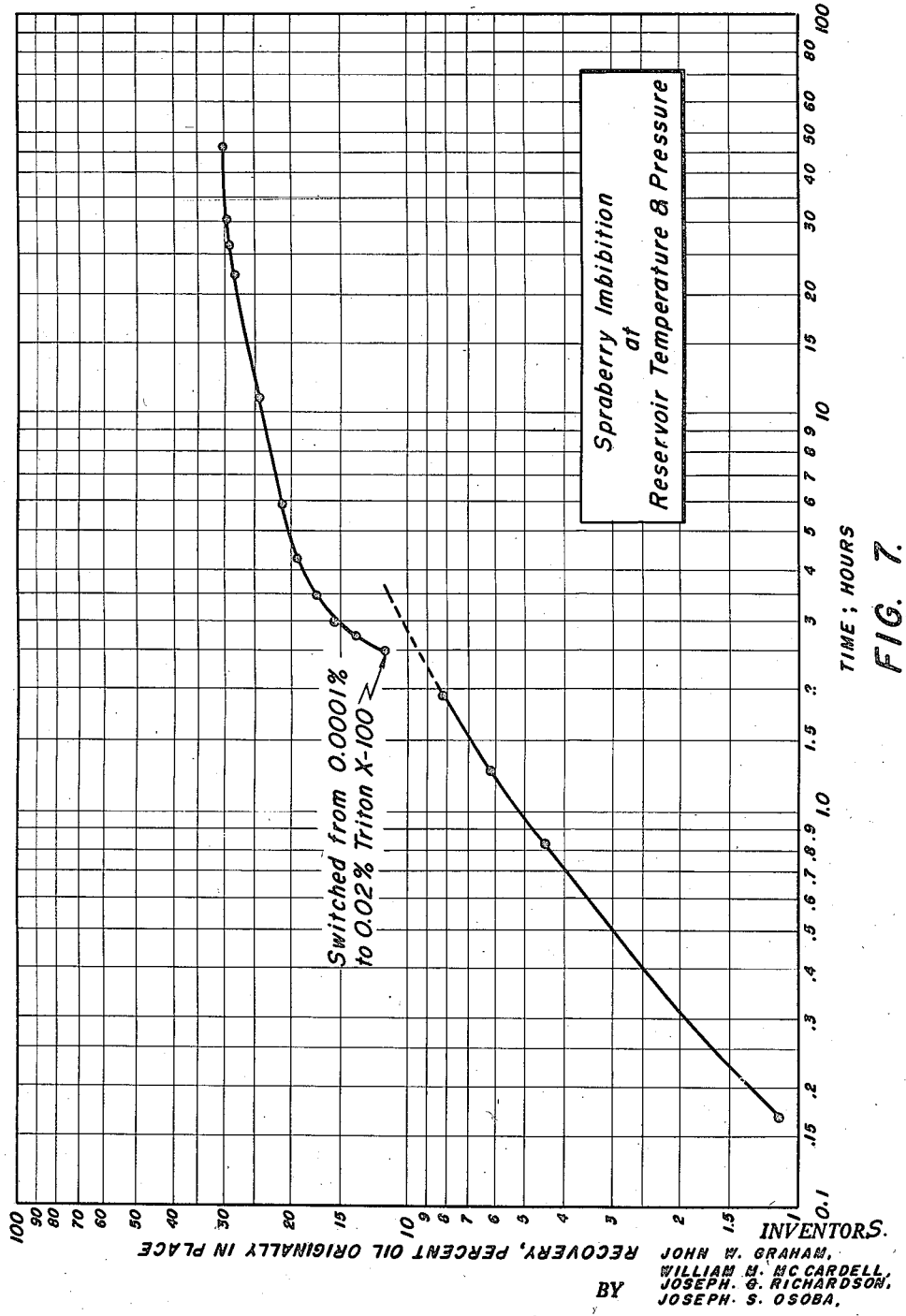

In a third series of tests, a fresh core from the Spraberry trend was saturated at reservoir conditions (140° F. and 2400 p. s. i. g.) with a subsurface sample of Spraberry oil. The core was approximately 3 inches in diameter and 4½ inches long. Following the saturation, the core was exposed to fresh water containing 0.0001% Triton X–100 for a period of 2.3 hours at 140° F. and 2400 p. s. i. g. It was then exposed to fresh water containing 0.02% Triton X–100 under the same conditions of temperature and pressure. These results are shown in Figs. 6 and 7, Fig. 6 being a presentation on rectangular coordinate paper and Fig. 7 being a presentation on log-log paper. The amount of oil recovered represents 30% of the oil originally in place. It is evident from the results that the exposure of the core to the water containing the higher concentration of Triton X–100 greatly accelerated the rate of recovery of the oil from the core. Also a higher ultimate recovery may be obtained with a higher concentration of the surface active agent.

The effects of other surface active agents were determined on Berea sandstone cores. In this study, the cores were cylindrical in shape and mounted in Lucite in such a way that imbibition could take place at one end of the core only. Each core was saturated with 4.1% sodium chloride solution and then flooded with kerosene until only connate water and kerosene occupied the pore space of the core. Imbibition of 4.1% salt water was then started and, after a period of about an hour, the surface active agent was added to the water imbibed. The surface active agents employed were Hyamine 1622, Triton 771 and Triton X–155, the identity of which will be more fully described hereinafter. The results of these operations are shown in Fig. 8 where a marked increase in rate of production of oil was observed in each case on addition of the surface active material to the water being imbibed. The amounts of the surface active agents employed in this instance are shown in Table II.

In order to illustrate the invention further, additional runs were made in which Priminox 10, Aerosol OT and Hyamine 2389 were employed in the practice of the present invention. The identity of these surface active agents will also be described further hereinafter. As in the previous tests, the cores were cylindrical in shape and mounted in Lucite in such a way as to permit imbibition to take place at one end of the core only. Of the four cores tested, the results of which are shown in Fig. 9, three cores $a$, $b$, and $c$ were prepared to contain connate water and kerosene in the manner described supra. After preparation, core "$a$" was allowed to imbibe water containing 4.1% salt by weight for a period of 0.8 of an hour, after which 0.01% Priminox was added to the imbibition water. This core showed a gradual but distinct increase in oil production rate after the addition of the Priminox 10 to the imbibition water. Core "$b$" was allowed to imbibe only the 4.1% salt solution throughout its production history. Core "$c$" was allowed to imbibe the 4.1% salt water and 0.02% Triton X–100 throughout its entire production history. These three cores, $a$, $b$, and $c$, had essentially the same values for porosity, connate water and permeability. The results presented in Fig. 9 permit a comparison of three types of production by imbibition and show the sequence method of the present invention, as illustrated by the results when Priminox 10 was used, to be markedly superior to continuous imbibition of water, core "$b$," and continuous imbibition of water containing surface active agent, core "C." Thus, the rate of oil production increased by sequence addition of the surface active agent, as in the present invention.

The fourth core of this series, core "$d$," was prepared to contain kerosene and a connate water with 4.1% salt and 3% by weight of Triton X–100. It was then allowed to imbibe water containing 4.1% salt for a period of four hours at which time 0.02% Triton X–100 was added to the water being imbibed. This experiment was conducted to prove that the introduction of a strong interfacial tension gradient properly directed in a core at the imbibition face increases the imbibition rate. During the first four hours of this experiment, the interfacial tension gradient was the reverse of that necessary to increase the imbibition rate. Thus the oil-water interfacial tension within the core was much lower than that at the imbibition face. This condition greatly depressed the oil production rate. This low rate was then markedly increased after a period of four hours by reducing the magnitude of the reversed interfacial tension gradient at the imbibition face through the addition of the small amount, 0.02%, of the surface active agent. These data prove that the amount of the surface active agent, if any, employed initially, must be smaller than the amount employed in the second step of the operation in accordance with the present invention. Stating this otherwise, the surface active agent, if any, employed initially must be used in a small amount or have different characteristics from that employed in the second step of our invention.

The results obtained with Aerosol OT and Hyamine 2389 are shown in Figs. 10 and 11, respectively. In both cases the addition of the surface active agent to the imbibition water caused an increase in oil production rate. The Aerosol OT was tested in a Berea sandstone core containing connate 4.1% sodium chloride solution and kerosene. After a little over an hour of imbibition of 4.1% salt water, the Aerosol OT was added to the water being imbibed. It will be seen that immediately the production rate was increased to a marked extent.

The Hyamine 2389 was added to a core from the Spraberry formation. This core was prepared to contain approximately connate water by adding 14% salt water solution to it and then saturating the core with kerosene. The kerosene saturated core was then allowed to imbibe 14% salt water for almost an hour before 0.1% Hyamine 2389 was added to the imbibition water. As will be seen from an inspection of Fig. 11, the curve for the oil produced rose sharply and then leveled off.

The identity of the several surface active materials employed giving the chemical structure and other characteristics are shown in Table I.

Table I

1. Triton X-100; mol. wt. 600–650; non-ionic; alkyl aryl polyether alcohol. "n" may be 9 or 10.

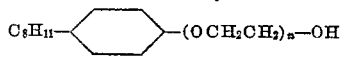

2. Triton X-155; mol. wt. 1450; non-ionic; cross linked alkyl aryl polyether alcohol.

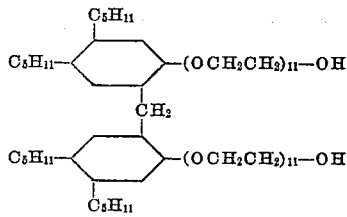

3. Triton 771 (conc.); mol. wt. depends on n; anionic; sodium salt of an alkyl aryl polyether sulfate.

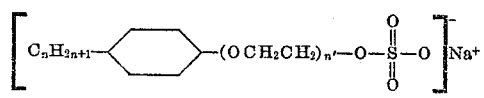

4. 3M-wetting agent F-126; mol. wt. 500; anionic; ammonium salt of perfluoro lauric acid.

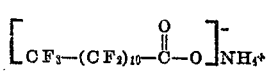

5. Aerosol OT; mol. wt. 445; anionic; di-octyl sodium sulfosuccinate.

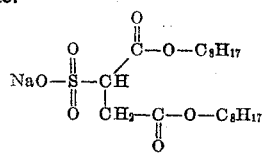

6. Hyamine 2389; mol. wt. 368; cationic; methyl dodecyl benzyl trimethyl ammonium chloride.

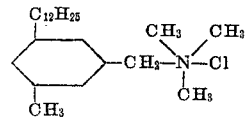

7. Hyamine 1622; mol. wt. 477; cationic; para di-isobutyl phenoxy ethoxy ethyl dimethyl benzyl ammonium chloride.

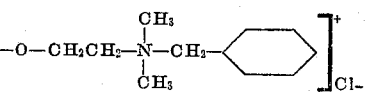

8. Priminox 10; mol. wt. 465–550; cationic; tertiary alkyl tetraethoxy ethanolamine; alkyl group may contain 18–24 carbons.

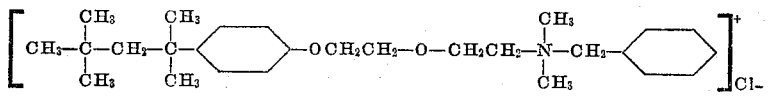

The data showing the characteristics of the cores, the surface active agents employed and the amount used are presented in Table II:

Table II

| Substance Tested | | | Core Properties | | | | |
|---|---|---|---|---|---|---|---|
| Name | Type | | Amount Used, Wt. Percent | Radius, Cm. | Length, Cm. | Porosity, Percent Core Volume | Connate Water, Percent Core Volume | Oil Permeability, Millidarcys |
| Triton X-100 | (Fig. 9) | Nonionic | 0.02 | 1.26 | 5.74 | 19.7 | 17.0 | 56.4 |
| Do | do | do | { (1) None (2) 0.02 } | 1.26 | 5.22 | 17.1 | 6.5 | 32.8 |
| Priminox 10 | do | Cationic | 0.01 | 1.26 | 5.68 | 19.9 | 18.0 | 60.1 |
| None Used | do | do | 0 | 1.26 | 6.17 | 19.6 | 17.4 | 57.4 |
| Hyamine 1622 | (Fig. 8) | Cationic | 0.05 | 1.26 | 5.83 | 19.3 | 22.6 | 249 |
| Triton 771 Concentrate | do | Anionic | 0.05 | 1.26 | 5.87 | 19.4 | 20.9 | 164 |
| Triton X-155 | do | Nonionic | 0.03 | 1.26 | 5.02 | 19.0 | 16.6 | 64.5 |
| Aerosol OT | (Fig. 10) | Anionic | 0.05 | 1.26 | 5.88 | 19.5 | 18.0 | 48.7 |
| Hyamine 2389 | (Fig. 11) | Cationic | 0.1 | 1.26 | 5.64 | ¹ 12.5 | ¹ 30.0 | 0.29 |

¹ Estimated values.

The foregoing description taken with the drawing illustrating the invention and the several charts of the numerous examples illustrate that oil may be produced in substantial quantities and at higher rates over that heretofore possible from formations which are characterized by numerous fractures and/or channels of higher permeability, either vertical, horizontal or lateral. Thus the present invention, while described with respect to the Spraberry trend and illustrated with typical sandstone samples such as those from the Spraberry trend and from the Berea sandstone outcrop, applies to all reservoirs of low or relatively high permeability, the sections of which are characterized by capillary differences and not solely to fractured formations. For example, it applies to formations having source channels or layers or lenses that differ drastically in capillary properties. As examples of such reservoirs, besides the Spraberry trend in Texas, may be mentioned the Uinta Basin and the Kirk Field in Eastland County, Texas, as well as many others. Also, this invention may be used to recover additional quantities of oil from fields in which production operations have been abandoned and which are characterized by marked differences in capillarity. In well producing operations after excessive quantities of water are produced with the oil which necessitates abandonment of the well or field, substantial quantities of oil may remain in the sections of lower permeability. The present invention is applied in such cases by considering abandonment of the well or field after exhaustion as the end of the first stage in our sequence operations. Water containing the surface active agents is then pumped into the injection wells until this water reaches the production wells. Pumping operations are then stopped to permit imbibition to occur, which causes the oil remaining in the rock to flow into higher permeability channels. After this oil accumulation has occurred, pumping operations are resumed to flush the oil from the channels and the cycle is repeated if necessary.

The nature and objects of the present invention having been completely described and illustrated, what we wish to claim as new and useful and to secure by Letters Patent is:

1. A method for recovering petroleum from a subsurface petroleum source rock formation in which the petroleum source rock comprises porous rock solids sections adjacent channels of higher permeability than the porous rock solids sections which comprises first imbibing water containing a surface active agent in an amount in the range from 0.0001% to 0.005% by weight into said solids sections for a time in the range from approximately 1 week to approximately 3 years until substantial saturation and wetting of the solids are obtained in the solids adjacent the channels and the imbibition faces of the solids and then imbibing additional water containing a greater and effective amount in the range from about 0.001% to about 1.0% by weight of a surface active agent into said solids sections containing imbibed water to cause petroleum in said source rock to flow from the source rock into said channels, and recovering petroleum from said channels.

2. A method in accordance with claim 1 in which the water first imbibed into the solids contains a surface active agent different from the surface active agent in the water imbibed after the solids have been substantially saturated with water.

3. A method in accordance with claim 1 in which the surface active agent in the first and in the additionally imbibed water is a tertiary alkyl tetraethoxyethanolamine.

4. A method in accordance with claim 1 in which the surface active agent in the first and in the additionally imbibed water is non-ionic.

5. A method in accordance with claim 1 in which the surface active agent in the first and in the additionally imbibed water is anionic.

6. A method in accordance with claim 1 in which the surface active agent in the first and in the additionally imbibed water is cationic.

7. A method in accordance with claim 1 in which the water first imbibed and the water additionally imbibed is salt water.

8. A method in accordance with claim 1 in which the first imbibed water is under a pressure in the range between about 100 pounds per square inch and approximately the overburden pressure of the rock formation.

9. A method in accordance with claim 1 in which the porous rock solids sections have volumes ranging from about 10 to about 2000 cubic feet.

10. A method in accordance with claim 1 in which the surface active agent in the first and in the additionally imbibed water is an alkyl aryl polyether alcohol having a molecular weight in the range from 600 to 650.

11. A method in accordance with claim 1 in which the surface active agent in the first and in the additionally imbibed water is para di-isobutyl phenoxy ethoxy ethyl dimethyl benzyl ammonium chloride.

12. A method in accordance with claim 1 in which the surface active agent in the first and in the additionally imbibed water is a sodium salt of an alkyl aryl polyether sulfate.

13. A method in accordance with claim 1 in which the surface active agent in the first and in the additionally imbibed water is the ammonium salt of perfluoro lauric acid.

14. A method in accordance with claim 1 in which the first imbibed water contains 0.0001% of surface active agent and the additionally imbibed water contains 0.02% by weight of the same surface active agent.

15. A method for recovering petroleum from a subsurface petroleum source rock formation in which the petroleum source rock comprises porous rock solids sections adjacent channels of higher permeability than the porous rock solids sections which comprises first imbibing water into said solid sections for a time in the range from approximately one week to approximately three years until substantial saturation and wetting of the solids are obtained in the solids adjacent the channels and the imbibition faces of the solids and then imbibing additional water containing an amount in the range from about 0.001% to about 1.0% by weight of a surface active agent into said solid sections containing imbibed water to cause petroleum in said source rock to flow from the source rock into said channels, and recovering petroleum from said channels.

References Cited in the file of this patent

UNITED STATES PATENTS 2,233,381    De Groote _____ Feb. 25, 1941

OTHER REFERENCES

The Oil and Gas Journal, vol. 51, No. 28, November 17, 1952, pp. 264, 265, 377 and 378.

The Oil and Gas Journal, November 1, 1951, pp. 29 and 30.

(Copies of above publications in Scientific Library.)